United States Patent [19]

Bresie

[11] 4,033,186
[45] July 5, 1977

[54] METHOD AND APPARATUS FOR DOWN HOLE PRESSURE AND TEMPERATURE MEASUREMENT

[76] Inventor: Don Bresie, 8906 Little Walnut Parkway, Austin, Tex. 78758

[22] Filed: Aug. 6, 1976

[21] Appl. No.: 712,384

[52] U.S. Cl. .............................................. 73/154
[51] Int. Cl.² ........................................ E21B 47/06
[58] Field of Search .................... 73/151, 152, 154; 346/33 WL

[56] References Cited

UNITED STATES PATENTS 3,541,852   11/1970   Brown et al. .......................... 73/151
3,732,728   5/1973   Fitzpatrick ............................. 73/151

Primary Examiner—Jerry W. Myracle
Attorney, Agent, or Firm—Fidelman, Wolffe & Waldron

[57] ABSTRACT

In a down hole gauge signals from a plurality of parametric sensors are processed through a multiplexer and analog to digital converter and stored alternately in digitized binary format in a solid state memory for subsequent readout above the well surface. A preprogrammed solid state clock initiates measurement sequences and deactivates all circuits between sequences.

24 Claims, 5 Drawing Figures

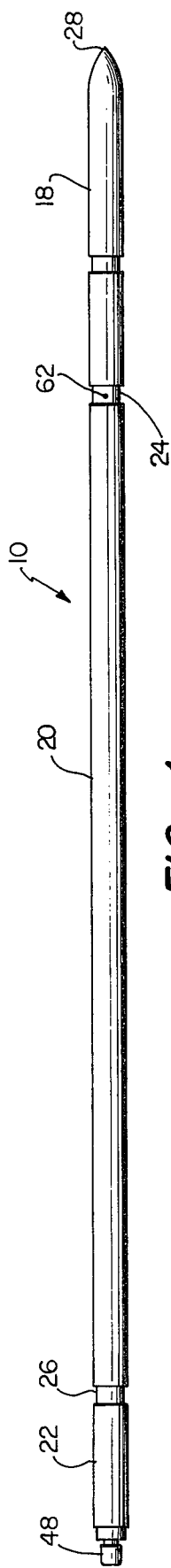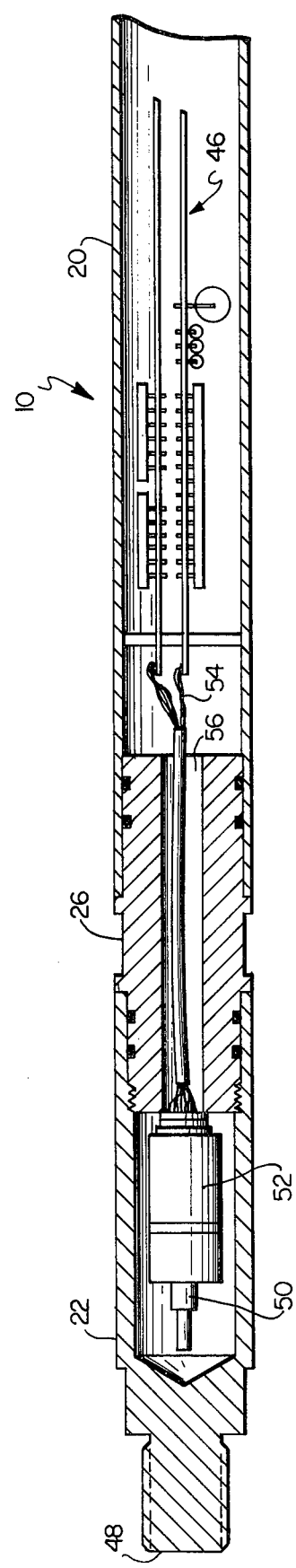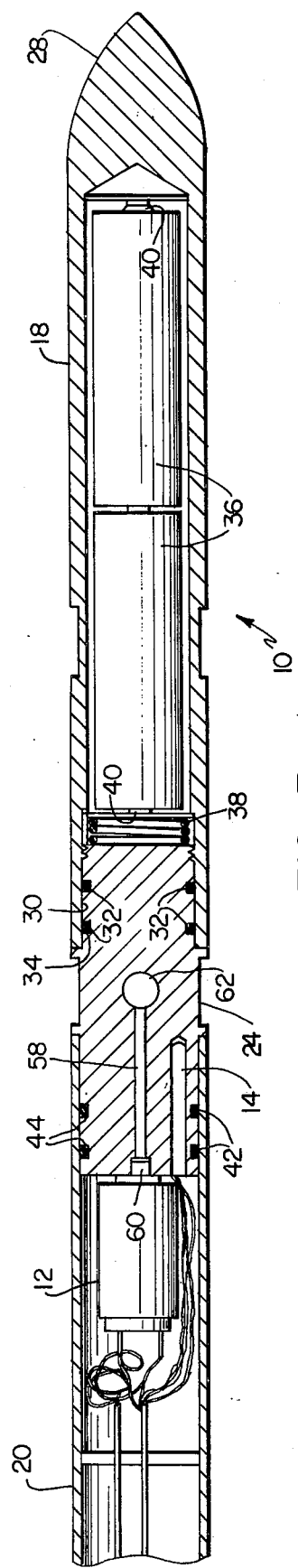

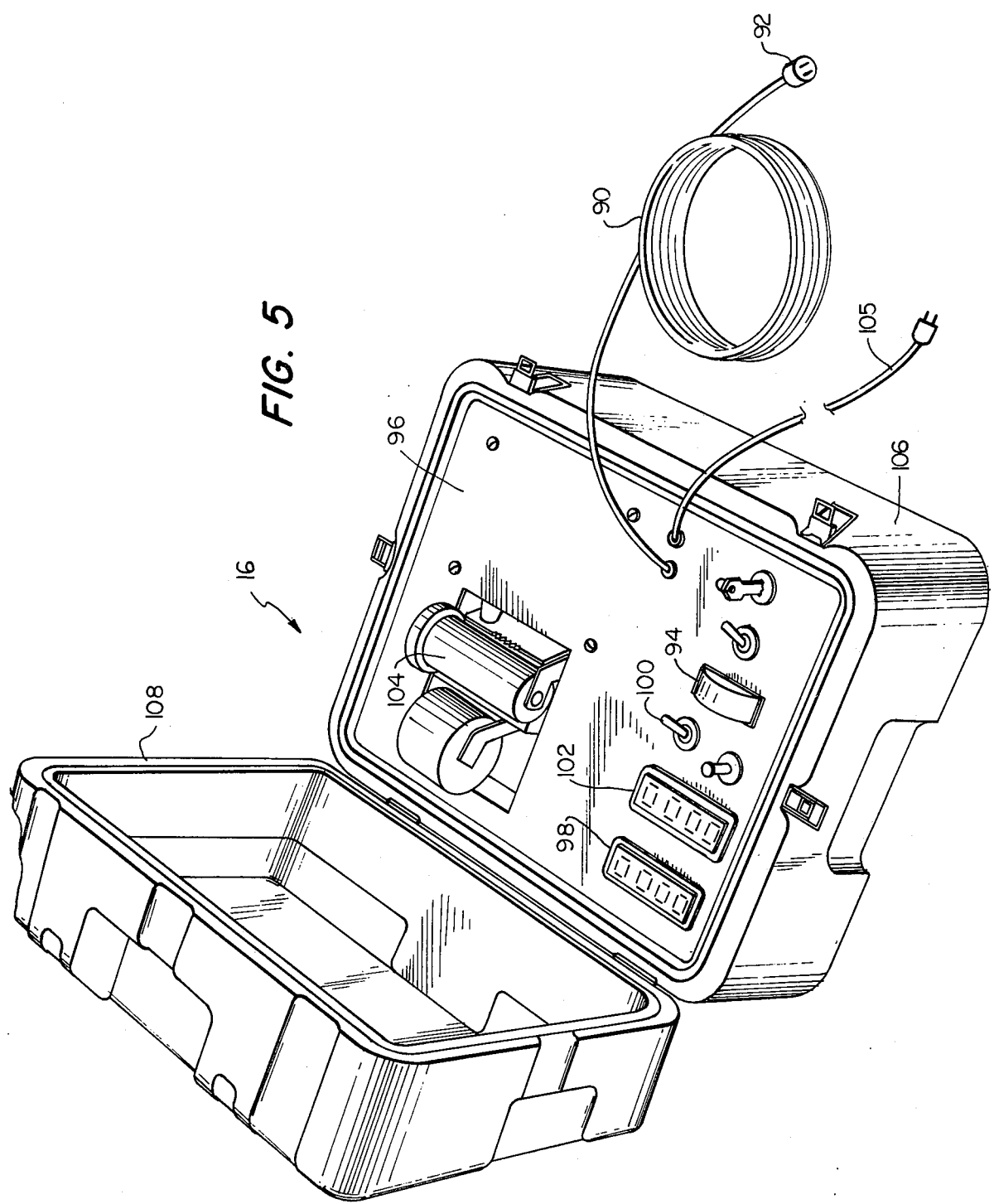

METHOD AND APPARATUS FOR DOWN HOLE PRESSURE AND TEMPERATURE MEASUREMENT

BACKGROUND OF THE INVENTION

The present invention relates generally to sensing down hole conditions in an oil well drill hole, and the like, and more particularly to an instrument system for measuring pressure and temperature conditions within the well as a function of time and depth within the hole, and for recording the data.

The importance of obtaining down hole pressure and temperature readings has long been recognized in the petroleum industry. For example, the pressence and thickness of oil and water layers below the surface can be determined and distinguished by the pressure gradient existing between different depths along the well hole. The rate of decrease in pressure at the bottom of the well with time when oil flows, and the rate of recovery in pressure with time when flow is terminated is indicative of the geological characteristics of the oil bearing structure.

In the prior art down-hole gauges have relied on electromechanical systems to record the desired data. Well pressure is frequently sensed via the expansion and contraction of a Bourdon tube and data is recorded on a moving chart using a stylus engaged by a linkage mechanism, or directly, to a moving end of the Bourdon tube. Uniform chart motion and accurate stylus response are requisites. The mechanical systems tend to be large and intricate and the timing motor for the chart drive causes a continuous and substantial drain on the batteries which are part of the underground apparatus. Because the diameter of the guage is limited by the drill tubing diameter, the length of the gauges is large, in the order of 6 feet. With modern production techniques, where the tubes curve, and may bend with a radius as small as 5 feet, instruments of extended length are inapplicable.

Provision must also be made in the design to retrieve the chart, which may be flat or on a cylindical drum, from the mechanical mechanism and to insert a replacement. The analog trace from the chart is then manually interpreted and re-recorded in terms of the desired parameters, e.g., pressure and temperature.

SUMMARY OF THE INVENTION

The present invention provides an instrument system for obtaining down hole pressure and temperature measurements which includes sub-surface electronically controlled acquisition, processing and storage of data in digitized binary format and above-surface readout and presentation of the data in a format of parametric values. The sub-surface apparatus is a physical entity independent of the above-surface unit and is self contained. Included within the sub-surface unit are the pressure and temperature sensors, a quartz crystal electronic clock, signal processors, a signal multiplexer, a non-volatile memory storage, a controller, and battery power supplies.

Readings of data are recorded at predetermined times, programmed above surface prior to a test run, and controlled subsurface by the clock. Signals from each sensor are amplified through separate channels. The amplified signals move alternately through a multiplexer and are digitized in an analog to digital converter. Then the signals are imputted to memory storage where they are retained for later readout above the surface. The memory address is advanced at each time which has been predetermined for data acquisition. To conserve battery energy, all elements except the clock are disconnected from the power supply and inoperative after each set of readings and until the programmed clock activates the system for the next set of readings.

The sub-surface device is lowered into the well tube suspended from a line e.g., wire, cable, or pipe, whose depolyed length indicates the depth of the gage beneath the reference surface at the time of reading.

OBJECTS OF THE INVENTION

An object of the present invention is to provide a down hole guage which records well pressure and temperature substantially simultaneously.

Another object of this invention is to provide a down hole guage which is substantially free of moving internal parts.

Still another object is to provide a down hole guage which employs electronic methods to process and store pressure and temperature signals from the sensors.

Yet another object of this invention is to provide a down hole gauge which is self contained, relatively small in size, and is economical in electrical power consumption.

A further object of this invention is to provide a down hole pressure gauge from which recorded data is retrieved without disassembly of the unit.

Another object of this invention is to provide a down hole gauge which provides an accurate correlation between well pressure and temperature and the time of taking the readings, and takes readings in accordance with a predetermined time schedule which can provide either long or short intervals between consecutive readings.

And yet another object of the present invention is to provide a down hole gauge which stores pressure and temperature data in digitized format in a common memory storage.

A further object of this invention is to provide on-site readout of digitized pressure and temperature data from memory storage, and presentation of said data in conventional units or analog display.

Other objects, advantages and novel features of the present invention will become apparent from the following detailed description of the invention in conjunction with the accompanying drawing in which:

FIG. 1 is a somewhat schematic side view of the down hole gauge of this invention. FIG. 2 is a somewhat schematic crossectional view to an enlarged scale of the rearward end of the down hole guage of FIG. 1.

FIG. 3 is a somewhat schematic crossectional view to an enlarged scale of the forward end of the down hole guage of FIG. 1.

FIG. 5 is a perspective view of the data readout unit associated with the guage of FIG. 1.

Figure 4:
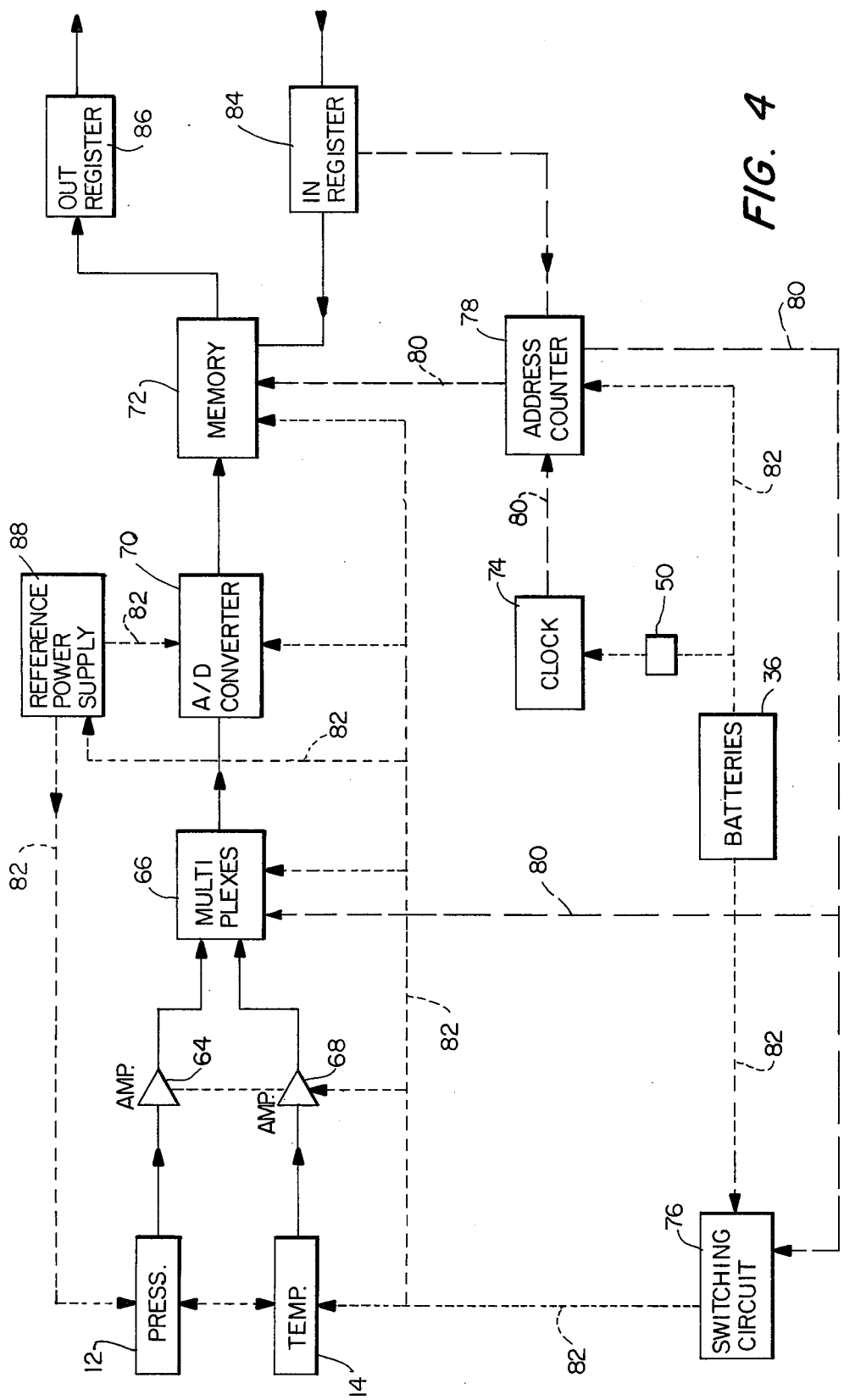
FIG. 4 is a block diagram of the power, control and data processing functions of the guage of FIG. 1.

With reference to FIGS. 1–3,5, the down hole guage 10 of this invention is suited for insertion into the drill piping of an oil or gas well, and for lowering on a line e.g., cable, tube, to the well bottom. At the well bottom and at selected depths during descent pressure and temperature sensors 12,14 in the guage 10 which are exposed to well ambient conditions, are activated at preselected intervals. Signals from these sensors are processed and stored electronically within the guage 10 for retrieval and display above the surface using a readout unit 16 suited to this purpose.

The down hole guage 10 of this invention is comprised of a plurality of generally hollow cylindrical casings 18,20,22 joined together by generally solid connector sections 24,26 to form an integral, elongate, torpedo-like assembly.

The battery case 18 is at the forward end of the guage 10, that is the downward end as the guage descends the well shaft, and terminates in a bullet-nose 28.

The rearward end of the battery case 18 is closed by a connector 24 which is press-fitted (or threaded) to the inner circumferential surface 30 of the hollow battery case 18. O-rings 32 in grooves 34 slidably press on the inner surface 30 of the battery case 18 thereby providing a liquid and moisture seal against ingress of ambient substances e.g. oil, water, gas, for the battery casing 18. Keying devices (not shown) may be used to assure a preferred alignment between the connector 24 and battery casing 18. Within the battery casing 18 are a plurality of electric storage batteries 36, e.g. dry cells, furnishing the direct current (DC) power which energizes the date anc control networks. The force of spring 38 between the connector 24 and battery 36 assures good contact between batteries 36, and at the battery end terminal 40. DC power leads (not shown) pass through the connector 24 and extend into the other gauge compartments for connection to circuit elements as more fully described hereinafter. Location of the batteries 36 at one end of the gauge 10 allows removal and exchange of exhausted batteries 36 without any need to disassemble the remainder of the device.

The midsection of the down hole gauge is a hollow casing 20 which is joined to the forward connector 24 by a hermetic joint similar to that described above comprised of O-rings 42 and grooves 44. The pressure sensor 12 and electronic circuit elements generally indicated by number 46 are maintained in the casing 20 hermetically sealed against the external ambient at the rear end by the connector 26 which joins to the casing 20 with O-rings and grooves as described above. The electronic circuit elements 46 within the casing 20 include printed circuit boards, integrated circuits, and conventional commercially available electronic components.

The control casing 22 is a hollow cup threadably attached to the connector 26 and sealed against the external ambient environment by O-rings in grooves as described above. The closed end of the control casing 22 away from the connector 26 is the upper end of the assembled gauge 10 as it decends into the well shaft. Attachment means (generally indicated as number 48) provide for connection of the wire line or cable (not shown) on which the gauge is lowered and raised. A switch 50 and time scale selector 52 are housed within the control casing 22 and electrical leads 54 communicate to the electronics case 20 via a hole 56 through the connector 26.

The forward connector 24 has an open duct 58 which extends between the input 60 of the pressure sensor 12 and the external ambient via an exposed lateral opening 62 in the connector 24. In a particular embodiment a diaphragm strain gauge transducer, for example, Series 210-10, Standard Controls, Inc. Seattle, Washington, was used satisfactorily to measure pressure. It has the advantage, in addition to accuracy and sensitivity, of operating essentially without moving parts in that only slight deflection of the diaphragm is required to produce a signal representative of pressure.

The temperature sensor is embedded in the connector 24 and is of a type producing a voltage change directly, e.g. a thermocouple, or a circuit voltage change resulting from resistance change when ambient temperature changes. The connector 24 is fabricated of thermally conductive material such that the temperature sensor 14 is substantially responsive to the temperature of the external ambient.

With reference to FIG. 4 the voltage signal from the pressure sensor 12 is fed to a first amplifier 64 and then to the input terminals of a multiplexer 66. The voltage signal from the temperature sensor 14 is fed via a separate path to a second amplifier 68 and thence to the input terminals of the multiplexer 66. The multiplexer 66 feeds separate pressure and temperature signals alternately through to an analog to digital converter 70. In the analog to digital converter 70 the magnitude of the voltage signal is converted by known circuitry into a discrete number represented by binary digital bits. The binary output of the converter 70 is stored in the electronic memory 72 for readout above the well surface 70. The binary bits representing temperature are written into the memory 72 as they are outputted by the converter 70. Alternately the binary bits representing pressure are written into the same memory address. It should be recognized that the order of storage of pressure and temperature readings can be reversed. Thus through use of the multiplexer 66 the two signals from independent sensors 12,14 are stored consecutively in digitized format in one memory address. Thereby the interrelated measurements of pressure and temperature made at closely spaced intervals are stored together. In a particular embodiment the memory 72 had 512 memory addresses of 12 bits for storage of data providing capability to take 512 independent sets of readings at 512 different times, for example Nitron Series NC 7010 Cupertino, Calif. Memory 72 is nonvolatile so that data once inputted is retained even when electrical power is removed. Old data is destroyed, removed from memory, by electrical erasure by the data readout unit or by treatment with ultra violet light.

The clock 74 is connected through the switch 50 to the batteries 36. The clock 74, is programmable when above the well surface to produce a reading sequence providing for as many as 512 readings. The time between readings may be as little as one to three seconds and ranges up to several minutes as desired. A delay can be programmed into the clock so that the first reading sequence is to initiated until the guage 10 has been inserted into the well shaft to a desired depth.

During the interval between readings, the switching circuit 76 cuts off battery power from all data processing elements leaving only the clock 74 energized. Power consumption is reduced by several orders of magnitude over the prior art. The clock 74 sends energizing signals to the address counter when a programmed time for measurement is reached.

The address counter serves two primary functions namely directing the switching circuit 76, on signal from the clock 74, to activate the data sensing and processing circuitry e.g. sensors 12,14; amplifiers 64,68; multiplexer 66; analog to digital converter 70; memory 72, by application thereto of electrical energy from the batteries 36. And secondly causing the address in the memory to advance by one address location.

The broken line 80 of FIG. 4 indicates the path of control signals from the clock 74 to the address counter 78 and thence to the power switching circuit 76, memory 72 and multiplexer 66. The dotted lines 82 of FIG. 4 indicate paths of electrical power from the batteries 36 to the various components.

The input register 84 and output register 86 which are incorporated in the electronic case 20 serve, when the unit is above the well surface and opened, to readout data from the memory 72; to set the address counter prior to a test series of readings, to read data memory or clear the memory if desired, all in the conventional manner.

The reference power supply 88 is associated with the pressure and temperature transducers 12,14 which typically are utilized in a bridge type network wherein a change in resistance in the transducer unbalances the bridge and provides an output signal to the amplifier. Design of such sensor circuits is well known, is not a novel part of the present invention and therefore is not described in detail herein. The reference power supply 88 appears in FIG. 4 associated with the sensors 12,14 and switching circuit 76 via the dotted power lines 82 in order to indicate that electrical power to the sensor circuits is cut off, as with the other electronic elements, except when a reading is to be taken in accordance with the clock program. Thus, power consumption, and the size of the battery case 18 is reduced by deactivating all circuits between measurements.

Transistorized solid state circuitry, printed circuit boards and integrated circuit components are used throughout to achieve accuracy, reliability, small size and low power consumption without moving parts. Use of multiplexing (or channel switching) and serial readout of data from memory reduce the number of components and connecting leads required within the circuits. A magnetic type core memory used in a particular embodiment provides for storage of 512 pairs of readings in a small space, in a binary digitized format, without use of moving parts as with prior art chart and stylus. Additionally data readout from the core memory is in condition for additional automatic computerized processing; transmission by phone or cable, printout or plotting in analog format, etc. No such advantages exist with the mechanical recording devices of the prior art. Additionally through use of the multiplexer 66 both pressure and temperature for a given time are stored at the same memory address.

In a particular embodiment the clock 74 is solid state crystal controlled and is programmable above the well surface via the time scale selector 52 for a variety of continuous reading rates or for varied time spacing between readings. Additionally the delay prior to the first measurement, following actuation of the clock by closing of the electronic switch 50, is programmed above the well surface via the input register 84. The solid state clock replaces the mechanical clocks of the prior art and provides with a single device flexibility in the timing program which previously was only available by changing mechanisms.

The above-surface readout unit 16 is used in combination with the guage 10 of this invention prior to insertion in and after removal of the guage 10 from the well shaft. With the control case 22 removed from the guage 10, the data cable 90 and plug 92 are connected to a mating receptable (not shown) otherwise concealed within the control case 22. Using circuits well known in the art the condition of the batteries 36 in the guage 10 is indicated on a meter 94 on the panel 96 of the readout unit 16.

Data is readout of the memory 72 via the output register 86 and by means of a microprocessor (not shown) within the readout unit 16 is presented in decimal format on a register 98 on the panel 96. Actuation of the panel switch 100 allows readout of either pressure or temperature on register 98.

Time of readings is taken from the clock program and is displayed in decimal format on the second register 102 concurrently with the pressure/temperature reading. Using the microprocessor the data is also printed out by the printer 104, when desired, as tables in decimal format or as analong graphs.

The readout unit 16 may be battery powered or externally connected via a power cord 105, thereby providing immediate onsite inspection of the data and rapid transmission of data therefrom. All circuit components are within the case 106 and the panel 96 is protected by the hinged cover 108.

On operating the apparatus of this invention, the readout unit 16 is connected to the down hole gauge 10 above the well surface and the timing program and delay prior to the first recorded measurement is inputted via the input register 84. The memory is cleared of old data to avoid possible confusion between runs. Then, in sequence, the clock 74 is energized by actuation of the switch 50; the readout unit 16 is disconnected from the gauge 10; and the control case 22 is threaded into place completely sealing the gauge 10.

The down hole gauge 10 is then lowered into the well shaft on a wire line (not shown) fastened to the gauge 10 at the point of attachment 48. Depth of the gauge 10 in the well shaft is measured by recording the length of the wire line deployed in relation to the time elapsed following power activation of the clock 74. The clock causes recording of pressure and temperature signals in sequence according to the preprogrammed schedule, which may include a time delay prior to the first data acquisition. It is unnecessary to store time data in the memory 72; the relationship between elapsed time and data in a given memory address is fixed by the clock program.

The down hole gauge 10 of this invention is not to be considered as limited to the above described device. For example, in an alternative embodiment a signal representative of time may be stored in memory substantially concurrently with the sensor signals. Also in an alternative embodiment electrical power may be carried from above the well surface along the suspension line to the gauge 10 in the well, thereby reducing the overall length of the device by elimination of enclosed batteries. Need to disassemble in order to change batteries is also eliminated. Also rechargeable batteries may be used which are not removed for charging. And in an alternative embodiment substantially real-time readout of data from the memory may be had in a known manner above the well surface via a cable or other transmission means during the intervals between senser readings. Also in an alternative embodiment real-time commands to take measurements may be transmitted to the gauge which commands override the preprogrammed schedule of measurements. Also the sensors which may be applied to the gauge are not limited to those measuring pressure and temperature. Other sensors may be used in an alternative embodiment of this invention including for example, gas analysis, moisture content, viscosity. Nor is the number of sensors limited to two; in an alternative embodiment multiplexing (channel switching) is provided between additional sensor channels and address size is increased.

What is claimed:

1. A method of measuring and recording parametric conditions in an oil well using a down hole gauge including sensors and data processing elements comprising the steps of:
   programming a clock device in said gauge to activate measuring, processing, and storage elements in said gauge at predetermined times;
   lowering said down hole gauge into said well to a first predetermined depth at a first predetermined time;
   activating by said clock of said measuring, processing and storage elements at said first predetermined time and depth;
   advancing said storage element to receive data in the next memory address within said storage element;
   sensing said parametric conditions within said well with said sensors after said clock device activates said measuring, processing and storage elements at said first predetermined time;
   amplifying in separate channels signals from each of said sensors, said signals being indicative of said parametric conditions at said first predetermined time;
   alternately feeding said amplified parametric signals to an analong to digital converter;
   converting said alternating amplified signals to a digital format;
   storing the output of said analog to digital converter in said next address of said storage element;
   deactivating by said clock said measuring, processing and storage elements after completion of said data storage at said first predetermined time.

2. The method of claim 1 wherein the steps of activating, advancing, sensing, amplifying, alternately feeding, converting, storing and deactivating are repeated at additional predetermined times in accordance with said programming of said clock device.

3. The method of claim 1 further comprising the steps of:
   withdrawing said down hole gauge from said well;
   reading out said stored data from said storage element;
   displaying said read out data in comprehensible format.

4. The method of claim 3 wherein said comprehensible format includes a printer and decimal display.

5. The method of claim 1 wherein said parametric sensors include pressure and temperature sensors.

6. The method of claim 5, wherein said pressure sensor includes a strain gauge diaphragm transducer.

7. The method of claim 1 wherein said measuring, processing and storage elements are comprised of solid state electronic components.

8. The method of claim 1 wherein said output of said analog to digital converter is in binary digital format.

9. The method of claim 1 wherein said storage element is non-volatile whereby data stored therein is retained when said storage element is deactivated.

10. The method of claim 9 wherein said non-volatile storage element is a magnetic core type memory device.

11. The method of claim 1 wherein said clock device is a solid state crystal controlled clock device.

12. A down hole gauge apparatus for measuring and recording parametric conditions in an oil well, comprising:
   parametric sensors each to produce a signal indicative of a selected parametric condition in said well;
   individual amplifier devices for each of said signals;
   a multiplexing device feeding each of said signals from said amplifier devices alternately to an analog to digital converter device, said converter device producing digital outputs each output representative of one of said alternating amplified sensor signals;
   a storage device having a memory address for receiving and storing said digital output from said converter device;
   an electrical power device to energize said apparatus;
   an enclosure to enclosure said sensors, and said devices, said enclosure sealed from said well ambient environment, said sensors communicating with said well ambient environment.

13. The apparatus of claim 12 further comprising:
   a continuously operating clock device programmed to initiate and interrupt energization of said apparatus by said power device in accordance with a predetermined schedule;
   a plurality of order memory addresses in said storage device;
   an address counter, on each energization of said apparatus advancing said storage device to receive said converter device outputs in the next memory address of said plurality of ordered memory addresses.

14. The apparatus of claim 13 wherein said programmed clock deenergizes said apparatus after each set of measurements by said parametric sensors and energizes said apparatus prior to the next programmed set of measurements by said sensors.

15. The apparatus of claim 13 wherein said clock device is a solid state crystal controlled clock device.

16. The apparatus of claim 12 further comprising: an input register and an output register.

17. The apparatus of claim 16 wherein all said devices, counters and registers are comprised of solid state electronic devices.

18. The apparatus of claim 16 further comprising in combination a readout device, said readout device being disengagably connected to said down hole gauge apparatus, and including
   means to readout, when connected, stored data from said storage device, and
   means to display said data in comprehensible format.

19. The apparatus of claim 18 wherein said comprehensible format includes a printer and decimal display.

20. The apparatus of claim 12 wherein said parametric sensors are pressure and temperature sensors.

21. The apparatus of claim 20 wherein said pressure sensor includes a strain gauge diaphragm type transducer.

22. The apparatus of claim 12 wherein said storage device is a non-volatile storage device.

23. The apparatus of claim 12 wherein said storage device is a magnetic core type memory device.

24. The apparatus of claim 12 wherein said digital outputs from said analog to digital converter device are in binary digital format.

* * * * *